Nov. 27, 1951     C. J. ROOD     2,576,144
OIL FILTER
Filed June 21, 1948                        2 SHEETS—SHEET 1
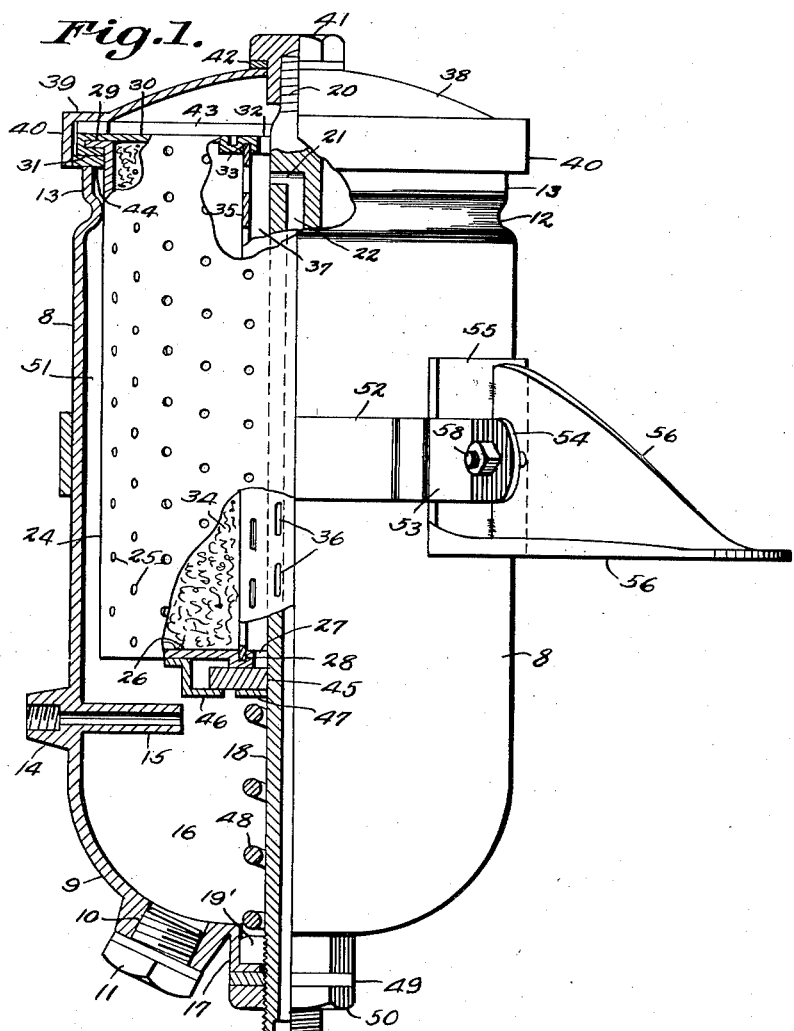
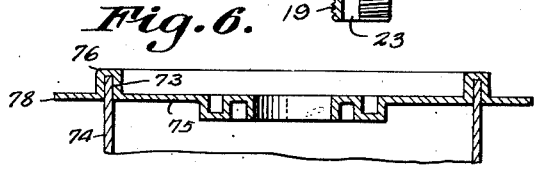
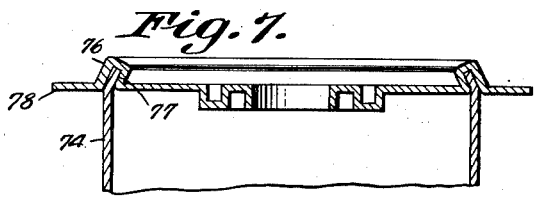
C. J. Rood
INVENTOR
BY (signature)
ATTORNEYS.

Nov. 27, 1951     C. J. ROOD     2,576,144
OIL FILTER
Filed June 21, 1948     2 SHEETS—SHEET 2
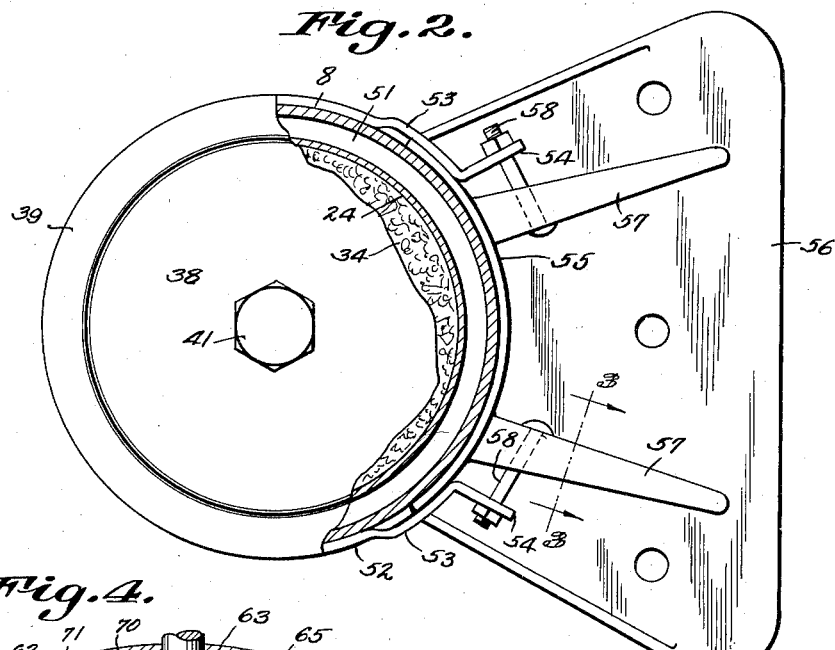
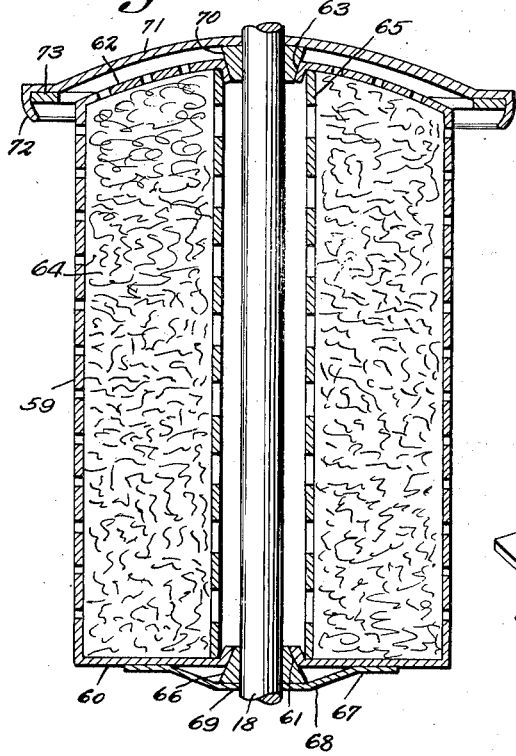
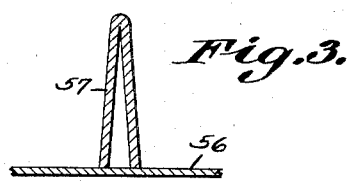
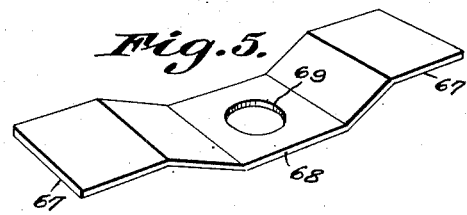
C. J. Rood
INVENTOR
BY
ATTORNEYS.

Patented Nov. 27, 1951

2,576,144

UNITED STATES PATENT OFFICE 2,576,144

OIL FILTER

Clarence J. Rood, Fergus Falls, Minn.

Application June 21, 1948, Serial No. 34,163

1 Claim. (Cl. 210—187)

This invention relates to filters, such as are commonly employed in connection with the lubricating system of an automobile vehicle or the like.

It is an important object of the present invention to provide a filter as described in which the filtering action will be improved by novel formation of the parts, to the end that the filter material used in the device will all be employed for its intended purpose, with no part of said filtering material being subjected to a heavier filtering function than any other part thereof.

Another important object is to provide a filter of the type stated in which the sealing means employed at various parts of the filter will be novelly formed and arranged in such a manner as to reduce considerably the possibility of leakage between the parts and from the filter as a whole, when the device is assembled and in use.

Still another object is to provide a filter as stated which can be constructed at relatively low expense, but which will nevertheless be durable, and will not readily get out of order, while yet being adapted to perform its intended functions efficiently over a long period of time.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 1 is a view of a filter constructed in accordance with the invention, shown partially in side elevation and partially in vertical section, portions being broken away.

Fig. 2 is a top plan view, portions being shown in horizontal section.

Fig. 3 is a detailed section on line 3—3 of Fig. 2.

Fig. 4 is a vertical section through a modified form of cartridge.

Fig. 5 is a perspective view of a retaining plate embodied in the cartridge of Fig. 4.

Fig. 6 is a vertical section through the upper portion of another modified form of cartridge, at an intermediate step of assembly.

Fig. 7 is a similar view of the cartridge of Fig. 6, the assembly being completed.

Referring to the drawings in detail, 8 designates a casing, open at its top and integrally formed with a curvingly depressed bottom portion 9 having formed therein near its center the nipple 10 that has a threaded opening serving as a drain, which opening is closed by the drain plug 11.

Near the upper edge of the casing 8, the side wall thereof is pressed inwardly as at 12 throughout the periphery of said casing, for the purpose of providing a centering guide for a cartridge unit to be described, and also for the purpose of strengthening the casing wall. Above the inwardly pressed portion 12, it will be observed that the casing wall is slightly inset as shown at 13, as compared to portions of the wall disposed below the inwardly pressed portion 12. This is for the purpose of centering the upper edge of the casing 8 relative to an annular gasket to be described, and which presses against said upper edge.

At a short distance above the lower end of the casing 8, but disposed below the bottom of the cartridge unit, is a nipple 14, formed for connection to the inlet line, not shown, of the lubricating system, which line extends from the crank case of the vehicle.

Inwardly extended from the casing wall, and terminating short of the longitudinal axis of the casing, is an inlet tube 15, which may be formed integral with the casing 8 if desired. This is in communication with the nipple, and through this tube oil to be filtered may enter the casing, said oil being forced into the inlet reservoir 16 at the lower end of the casing.

A main bolt 18 constitutes a means for assembling the portions of the device, and also provides an outlet passage for the oil after it has been filtered. The main bolt 18 may be and preferably is formed with a smooth outer surface for the greatest part of its length. At its lower end, however, it is threaded as at 19, said lower end projecting through a centrally disposed, depressed, non-circular seat 17 formed as part of the casing 8, and disposed centrally of the bottom portion 9 thereof. Received in this seat is a nut 19', correspondingly formed to the seat, so as to hold the bolt against rotation relative to the casing. Nut 19' can be welded or otherwise fixedly secured to the main bolt 18 if desired.

At its upper end, the main bolt 18 is reduced and threaded as at 20.

Near the reduced upper end 20 of the bolt, a lateral passageway 21 is formed in the bolt, this constituting an outlet for oil after said oil has been filtered. The inner terminus of the passageway 21 communicates at the center of the bolt with the upper end of the outlet passage 22, disposed axially of the bolt, and extending downwardly into communication wtih the outlet opening 23. At 23, as it will be understood, the outlet line of the lubricating system is connected, for returning the filtered oil to the crank case.

Referring now to the cartridge unit used in the filter, 24 designates the cylindrical side wall of said cartridge, that is perforated throughout its circumference, and from end to end thereof, as shown at 25. The lower end wall 26 of the cartridge is imperforate, said lower end wall having a central opening 27 of substantially larger diameter than the main bolt 18. At the edge of the opening 27, the lower end wall is crimped downwardly as at 28 to provide an annular seat for an inner tubular member of the cartridge, to be described hereinafter.

The upper edge of the side wall 24 is integral with an outwardly directed lateral flange 29, and an imperforate upper end wall 30 of the cartridge is peripherally formed to embrace the flange 29, as shown at 31. The upper end wall 30 has a central opening 32, which like the opening 27, is of greater diameter than the bolt 18. At the edge of the opening 32, end wall 30 is crimped to provide an upper annular seat for the aforementioned tubular member.

Filter material 34, preferably cotton waste or the like, is enclosed within the filter, but a hollow space is left at the center of the filter, extending from end to end thereof and surrounding the main bolt 18. This space is provided for by means of the inner tubular member 35 of the cartridge, having longitudinally disposed slots 36 from end to end thereof, and which member surrounds and is spaced from the main bolt to define an outlet reservoir 37 extending the length of the cartridge unit.

A cover is designated 38, and is preferably bulged upwardly as shown. Marginally the cover has a flat portion 39, that merges into a depending flange 40. An assembly nut 41 has a shank that extends through a central opening formed in the cover 38, said nut threading on the upper end 20 of the main bolt. Washer or seal 42 is interposed between the nut and the cover to prevent oil from leaking out of the device through the opening in the cover.

An annular gasket 43 is interposed between the marginal portion of the upper end wall 30 of the cartridge and the flat portion 39 of the cover. Another annular gasket 44 seats on the upper edge of the casing 8, and is pressed between said upper edge and the bottom surface of the marginal portion of the end wall 30.

To prevent leakage between the inlet reservoir 16 and the outlet reservoir 37, I provide a seal 45 of any suitable material that is fitted tightly to the main bolt 18. This seal is a part of the cartridge unit, as is the annular retaining member 46 that holds the seal assembled with the cartridge. Annular member 46 is secured to the under side of the lower end wall 26 of the cartridge. The upper surface of the seal 45 presses against the crimped portion 28 of the cartridge, while a washer 47 that surrounds the main bolt presses against the under side of said seal 45. A coil spring 48 engages the washer 47 at one end of the spring, the other end of the spring pressing against the nut 19' carried by the bolt.

Exteriorly of the depression 17 of the casing 8, a washer 49 is carried by the bolt, and a lower assembly nut 50 threads against the end 19 of the bolt to cooperate with the upper assembly nut 41 to hold the entire device assembled.

From the above, it will be observed that the filter as a whole is so designed as to permit ready assembly of its parts, and as also to permit ready substitution of new cartridge units whenever necessary. In this connection, it may be observed that all the seals and gaskets employed are so arranged as to permit all of them to be readily replaced when a new cartridge unit is to be substituted. Seal 45, for example, is carried by the cartridge unit itself, and thus when a new cartridge unit is to be mounted in the device, a new seal 45 would automatically be provided. Seals 42 and 49, designed to prevent leakage through the upper and lower ends of the device as a whole, also are conveniently replaced by removal of the assembly nuts 41 and 50 respectively. Gaskets 43 and 44, similarly, would be replaced when the cover is removed for the purpose of introducing a new cartridge unit.

It should further be noted that the cartridge unit as a whole, except for the seal 45, is spaced from the main bolt, and thus a certain amount of lateral deviation of the cartridge unit relative to the main bolt is permitted, without affecting in any way the efficiency of the device, when it is in operation.

Referring now to the operation of the device, oil to be filtered enters through the tube 15, being deposited in the filter device substantially centrally of the inlet reservoir 16, and at the upper end of said reservoir. The oil spreads out, and a preliminary deposit of grit heavier than the oil is made on the floor of the bottom portion 9 of the casing 8. This prolongs the life of the filtering material 34, since all of the grit carried by the oil when it enters the device will not necessarily be forced against said filtering material. From the inlet reservoir 16, the oil to be filtered is forced into the annular upper extension 51 of the inlet reservoir, which extension is defined between the side walls of the casing 8 and cartridge unit respectively. The inwardly pressed portion 12 of the casing side wall 8 constitutes the upper terminus of said passage or extension.

The oil now is forced into the side wall of the cartridge, entering through the openings 25. It will be observed that since the extension 51 is annular, and surrounds the entire cartridge, almost the whole length of the cartridge, the oil will be forced into all portions of the cartridge side wall in effect simultaneously, substantially from end to end of the cartridge.

The oil now is forced radially and inwardly of the cartridge, so that all the filtering material 34 is equally impregnated, and equally serves to discharge the function of said filtering material in cleansing the oil.

As the oil arrives at the center portion of the cartridge, it is forced through the slots 36 into the outlet reservoir 37. It moves upwardly through said reservoir, entering the opening 21 of the main bolt, and thence is forced from the device through the outlet passage 22.

In connection with the illustrated filter of Fig. 1, a mounting bracket is provided that comprises a strap 52 of one piece construction, extended substantially throughout the major portion of the circumference of the casing 8. Near the respective ends of the strap 52, the strap is pressed outwardly as at 53, and these outpressed portions 53 terminate in outwardly extended apertured ears 54. An arcuate member 55 extends through the rest of the circumference of the casing 8, the outpressed portions 53 overlying the ends of said arcuate member and being in slidable contact therewith.

The lower edge of the member 55 is rigid with an outwardly extended mounting plate 56, apertured as necessary for connection to a structural part of the engine. Vertical braces 57 welded or otherwise rigidly secured to the member 55 and to the plate 56 serve to hold the parts 55 and 56 relatively rigid. Openings are formed in the vertical braces 57, receiving fastening means 58, such as a nut and bolt, and the respective fastening means also extend through the apertures of the ears 54.

It will thus be observed that by removal of the fastening means 58, the mounting bracket is disassembled relative to the casing. Or, by tightening of the fastening means, the mounting bracket can accommodate casings of varying diameter, the fastening means when tightened holding the casing securely in a fixed position. The mounting bracket can be adjusted around the casing, additionally, so as to accommodate the device to varying structural designs of engines on which it is to be mounted.

It will be understood that the mounting bracket described above need not necessarily be used on a filter such as illustrated in Fig. 1, but would of course be capable of use to secure any filter of cylindrical formation.

Referring now to Fig. 4, there is here illustrated a modified form of cartridge, that can be substituted in the casing 8, for the cartridge unit illustrated in Fig. 1. In this modified form, a cylindrical side wall 59 is perforated throughout, and at its lower end is rigid with an imperforate lower end wall 60. The lower end wall 60 has a central opening of larger diameter than the diameter of the main bolt 18, and the edge portion of this opening is inclined upwardly to provide a conical seat 61.

At its upper end, the side wall 59 merges into an upper end wall 62 of the cartridge, that may or may not be bulged upwardly, the upwardly bulged construction illustrated being shown only as a preferred construction. The upper end wall 62 also has a central opening, the edge portion of which is inclined downwardly to provide a conical seat 63.

The cartridge of Fig. 4, as in the case of the cartridge of Fig. 1, has a tubular member disposed axially and centrally thereof, this being slotted to provide an outlet for filtered oil, and being designated 65.

A lower conical seal 66 is adapted to be pressed against the conical seat 61, seal 66 being of any suitable resilient and leak-preventive material, and being fitted closely to the bolt 18.

The lower seal 66 is held assembled with the cartridge unit by means of a retaining plate 67, shown in detail in Fig. 5, having end portions adapted to be secured to the lower end wall 60 of the cartridge, and having a medially depressed portion 68 that supports the seal 66. Portion 68 has a central opening 69 for passage of the bolt 18. It will thus be understood that when the spring 40 presses upwardly against the retaining plate 68, it will force the conical seal 66 tightly against its seat 61, thus preventing leaks between the inlet and outlet reservoirs of the device.

A conical upper seal is designated 70, and is adapted to be pressed tightly against the seat 63. The upper surface of the seal 70 is engaged by the cover 71, which can be a part of the entire cartridge unit, if desired. I believe it is apparent that if desired, a member such as illustrated at Fig. 5 could be provided at the upper end of the cartridge also, to engage the gasket 70 in the same manner that the gasket 66 is engaged at the lower end of said cartridge. The marginal portion of the cover 71 has a depending and inturned flange 72 adapted to retain the gasket 73.

In Figs. 6 and 7, there is illustrated another modification as to the cartridge unit, this dealing with the formation of the upper end of the cartridge. In this instance, the cartridge side wall is designated 74, while the upper end wall is designated 75. Centrally, the upper end wall 75 is formed like the upper end wall 30 of the form of Fig. 1.

Marginally, however, the upper end wall 75 is crimped upwardly as at 76, at a short distance from the periphery of said wall. This defines an annular seat 77 in the under side of the end wall 75, adapted to receive the upper edge of the side wall 74. This also defines an outwardly extended and laterally disposed flange 78, for supporting the cartridge to the casing 8.

The parts are first formed as shown in Fig. 6, and after being assembled as illustrated in this figure, the upper edge of the side wall 74, and the crimped portion 76 that embraces said upper edge, is pressed inwardly at an incline as shown in Fig. 7, thus to hold the parts securely assembled

What is claimed is:

A filter construction comprising an outer casing having a side inlet, the casing being formed integrally with a closed lower end wall having a non-circular center depression provided with a smooth-walled opening; a one-piece assembly bolt having threaded upper and lower ends and formed with an axial bore having its outlet at the lower end of the bolt, and its inlet intermediate opposite ends of the bolt, the lower end of the bolt projecting through and beyond said opening; a nut removably seated in the depression and threadedly engaging the lower end of the bolt interiorly of the casing; a second nut engaging the lower end of the bolt exteriorly of the casing, said lower end of the bolt projecting beyond the second nut and constituting a threaded neck for attaching an outlet hose; a cover for the upper end of the casing having a smooth-walled center opening through which the upper end of the bolt extends; a nut threaded on the upper end of the bolt exteriorly of and against the cover; and a filter cartridge clamped at its upper end between the cover and casing and proportioned to extend across the path of liquid to be filtered during flow of said liquid from the casing inlet to the inlet of said bore.

CLARENCE J. ROOD.

REFERENCES CITED

The following references are of record in the file of this patent:

UNITED STATES PATENTS

| Number | Name | Date |
| --- | --- | --- |
| 1,723,374 | Roehr | Aug. 6, 1929 |
| 2,134,061 | Thomas | Oct. 25, 1938 |
| 2,134,385 | Winslow | Oct. 25, 1938 |
| 2,305,654 | Wilkinson | Dec. 22, 1942 |
| 2,347,384 | Winslow et al. | Apr. 25, 1944 |
| 2,354,238 | Wilkinson | July 25, 1944 |
| 2,475,833 | Gunn | July 12, 1949 |